No. 845,699. PATENTED FEB. 26, 1907.
W. M. DIGHT.
HORSESHOE AND MEANS FOR ATTACHING THE SAME.
APPLICATION FILED JUNE 28, 1905. RENEWED JAN. 10, 1907.

Witnesses
Philip A. H. Terrell
May E. Moore

Inventor
William M. Dight.
by David Moore
Attorney

THE NORRIS PETERS CO., WASHINGTON, D. C.

UNITED STATES PATENT OFFICE.

WILLIAM MILLER DIGHT, OF JACKSON CENTER, PENNSYLVANIA.

HORSESHOE AND MEANS FOR ATTACHING THE SAME.

No. 845,699.   Specification of Letters Patent.   Patented Feb. 26, 1907.

Application filed June 28, 1905. Renewed January 10, 1907. Serial No. 351,692.

*To all whom it may concern:*

Be it known that I, WILLIAM MILLER DIGHT, a citizen of the United States, residing at Jackson Center, in the county of Mercer and State of Pennsylvania, have invented certain new and useful Improvements in Horseshoes and Means for Attaching the Same, of which the following is a specification, reference being had therein to the accompanying drawings.

My present invention relates to improvements in horseshoes and means for attaching the same, the object being to construct the device carried by the horseshoe by means of which the shoe can be readily removed or attached to the hoof of a horse without the necessary and injurious effect of driving nails.

To attain these objects, my invention consists of a new and novel construction of attaching device, as will presently appear.

Figure 1:
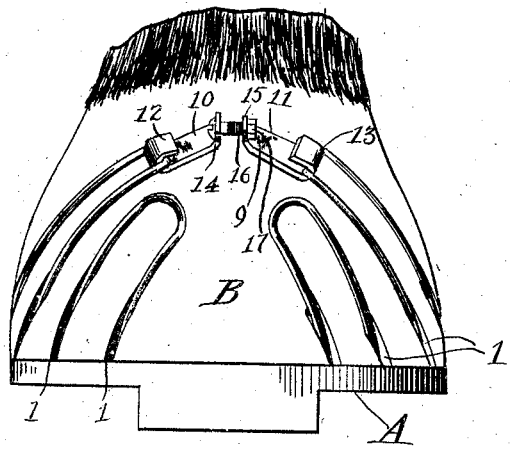
Figure 2:
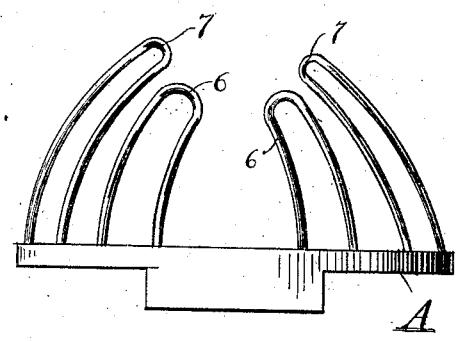
Figure 3:
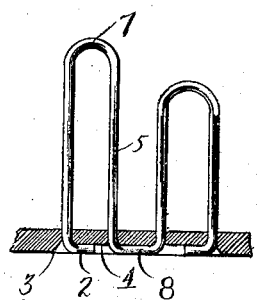

In the accompanying drawings, Figure 1 is a front elevation of my improvement as attached to a horse-hoof. Fig. 2 is a similar view of the device removed from the hoof, and Fig. 3 is a detail view of the bent-wire construction removed from the shoe.

Referring to the drawings, A designates the hoof of the horse, and B the shoe, the shoe being of the usual construction and provided with the usual number of openings.

In applying my invention by means of which the shoe is secured to the hoof I provide a series of recesses or grooves 1, extending from the lower edge or bottom of the hoof upwardly. Secured to the shoe and having its oppositely-inclined terminals 2 secured through the outer openings 3 of the shoe and embedded so as to be within the recess 4 of the bottom of the shoe is the supporting-wire 5. One of these are adapted to be placed on each side of the shoe, so that a pair is necessary to produce the desired result. Each piece of wire is bent to form a short loop 6 and a long loop 7, the two being connected together by means of the short strip 8, which fits within the recess in the bottom of the shoe, as the wire is adapted to pass through the two remaining openings of the body of the shoe, the shoe being constructed with the usual number of four openings upon each side. The short and long loops of the shoe are adapted to extend upward and be bent inward toward each other, so as to conform to the curvature of the horse's hoof and have the lower portions thereof enter the recesses or channels 1, formed in the hoof, so that when the clamping device 9 is placed in position the long loops are drawn tightly together upon the body of the hoof, so as to securely hold the shoe in position. This device consists of the two members 10 and 11, each one of which is provided with the hooked terminals 12 and 13 for the reception of the long loops of wire and with the two right-angled arms or terminals 14 and 15, through which is adapted to pass the adjusting and holding screw 16, provided with the screw-nut 17. As the screw or the nut is turned so as to draw the ends of the two members together the wire supporting devices are brought closely together and clamp the shoe tightly on the hoof.

When it is desired to remove the shoe, it is simply necessary to remove the screw and the clamping device and bend the loops outward, so as to be disengaged from the grooves of the hoof, thus producing a simple and efficient means for securing shoes upon the hoofs of horses so that it can be readily attached or detached.

What I claim as new, and desire to secure by Letters Patent, is—

In combination with a horseshoe of a device for connecting the same to a hoof consisting of two pieces of wire, one to each side of the shoe, each piece being bent to form a short front loop and a long rear loop, the ends of each piece entering the front and rear openings of the shoe from the upper side of the shoe and terminating within the groove of the shoe and the connection between both loops resting within the same groove of the shoe between the two center openings, and means connected to the two rear loops for clamping them upon the exterior of the hoof, for the purpose set forth.

In testimony whereof I affix my signature in presence of two witnesses.

WILLIAM MILLER DIGHT.

Witnesses:
 JAMES D. EMERY,
 JOHN A. MYERS.